United States Patent [19]

Choi

[11] Patent Number: 5,694,164
[45] Date of Patent: Dec. 2, 1997

[54] THREE-DIMENSIONAL PICTURE PROJECTING DEVICE

[75] Inventor: Soon-cheol Choi, Suwon, Rep. of Korea

[73] Assignee: Samsung Electronics Co., Ltd., Kyungki-do, Rep. of Korea

[21] Appl. No.: 678,271

[22] Filed: Jul. 11, 1996

[30] Foreign Application Priority Data

Jul. 11, 1995 [KR] Rep. of Korea ............... 95-20394

[51] Int. Cl.$^6$ .................................................. H04N 13/04
[52] U.S. Cl. ...................................... 348/57; 353/8
[58] Field of Search .................... 348/57, 58; 353/7, 353/8; H04N 13/04

[56] References Cited

U.S. PATENT DOCUMENTS 4,504,856  3/1985  Jackman ........................... 348/57
4,772,943  9/1988  Nakagawa ......................... 348/57
4,792,850  12/1988  Lipton ............................... 348/57
4,877,307  10/1989  Kalmanash ........................ 348/57

*Primary Examiner*—Howard W. Britton
*Attorney, Agent, or Firm*—Sughrue, Mion, Zinn, Macpeak & Seas, PLLC

[57] ABSTRACT

A three-dimensional picture projecting device comprises a projector for projecting a three-dimensional picture, a screen for capturing the projected three dimensional picture, and a pair of polarizing glasses having left and right polarizing eyepieces with different polarization directions. The projector includes a light source, a focusing lens for focusing the light emitted from the light source, picture forming means for receiving the light from the light source and forming left-eye and right-eye pictures, polarization changing means for making polarization directions of the left-eye and right-eye pictures different from each other, and a projection lens for magnifying the left-eye and right-eye pictures on the screen. Therefore, a three-dimensional picture can be provided with a single projector.

13 Claims, 4 Drawing Sheets

THREE-DIMENSIONAL PICTURE PROJECTING DEVICE

BACKGROUND OF THE INVENTION

The present invention relates to a three-dimensional picture projecting device, and more particularly, to a polarizing glasses type three-dimensional picture projecting device for providing a three-dimensional picture with a single projector by using a liquid crystal assembly or a phase delay plate.

Three-dimensional picture projecting devices are grouped into a glasses type and a non-glasses type according to whether polarizing glasses should be worn to view the pictures.

The non-glasses type three-dimensional picture projecting device provides a picture for the left eye and a picture for the right eye, separately, by using a lenticular lens or a grating, and obviates the need for wearing polarizing glasses to view the three-dimensional picture. However, the use of the lenticular lens or grating to provide the three-dimensional picture greatly restricts the range of a viewing angle.

Three-dimensional picture projecting devices of the glasses type are divided into a shutter type and a polarization type. The shutter type projecting device alternately projects the left-eye picture and the right-eye picture with a single projector. A viewer can enjoy three-dimensional pictures by wearing a pair of shutter glasses which operate in accordance with the frequency of the alternate projection. Liquid crystal devices are usually used as the shutters of the shutter glasses. A left-eye shutter is opened and at the same time a right-eye shutter is closed, when the picture projector projects the left-eye picture, and vice versa when the picture projector projects the right-eye picture. Despite the advantage of an unrestricted viewing range in such a shutter type projecting device, the device requires complicated manipulation and the viewer must wear the heavy shutter glasses electrically connected to the projector.

The other glasses type three-dimensional picture projecting device, i.e., the polarization type projecting device, employs two projectors for projecting the left-eye and right-eye pictures, respectively. One of the projectors is schematically illustrated in FIG. 1.

As shown, the projector includes a light source 10, a focusing lens 20, a polarizing plate 30, a liquid crystal assembly 40, and a projection lens 50.

The light source 10 is provided with a lamp 12 such as a halogen, tungsten or xenon lamp, and a reflection mirror 14. The focusing lens 20 focuses light emitted from the light source 10. A first polarizing plate 32, disposed between the focusing lens 20 and the liquid crystal assembly 40, polarizes the light transmitted through the focusing lens 20. The light polarized by the first polarizing plate 32 passes through the liquid crystal assembly 40 to which electric power is applied according to a video signal. The light transmitted through the liquid crystal assembly 40 passes through a second polarizing plate 34 and the projection lens 50, and reaches a screen 60, thus forming a picture.

The polarization type three-dimensional picture projecting device is provided with left-eye and right-eye projectors as constituted above. The left-eye and right-eye projectors, having polarizing plates of different polarizing directions, project the left-eye and right-eye pictures, respectively. A viewer can enjoy the three-dimensional picture by wearing polarizing glasses with left and right polarizing eyepieces having the same polarizing directions as the polarized directions of the respective pictures projected on the screen.

The polarization type three-dimensional picture projecting device has the advantages of comfortable viewing due to relatively lightweight glasses and a wide view range in contrast to the non-glasses type projecting device.

Such a three-dimensional picture projecting device, however, is large and costly since it requires two projectors.

SUMMARY OF THE INVENTION

The object of the present invention is to provide a glasses type three-dimensional projecting device for providing a three-dimensional picture with a single projector.

To achieve the above object, there is provided a three-dimensional picture projecting device comprising: a projector for projecting a three-dimensional picture; a screen for capturing the projected three dimensional picture; and a pair of polarizing glasses having left and right polarizing eyepieces with different polarization directions, wherein the projector includes a light source; a focusing lens for focusing the light emitted from the light source; picture forming means for receiving the light from the light source and forming left-eye and right-eye pictures; polarization changing means for providing polarization directions of the left-eye and right-eye pictures are different from each other; and a projection lens for magnifying the left-eye and right-eye pictures on the screen.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

The three-dimensional picture projecting device of the present invention includes a projector, a screen for capturing the projected picture and a pair of polarizing glasses (not shown) having left and right polarizing eyepieces whose polarization directions are different from each other.

Figure 1:
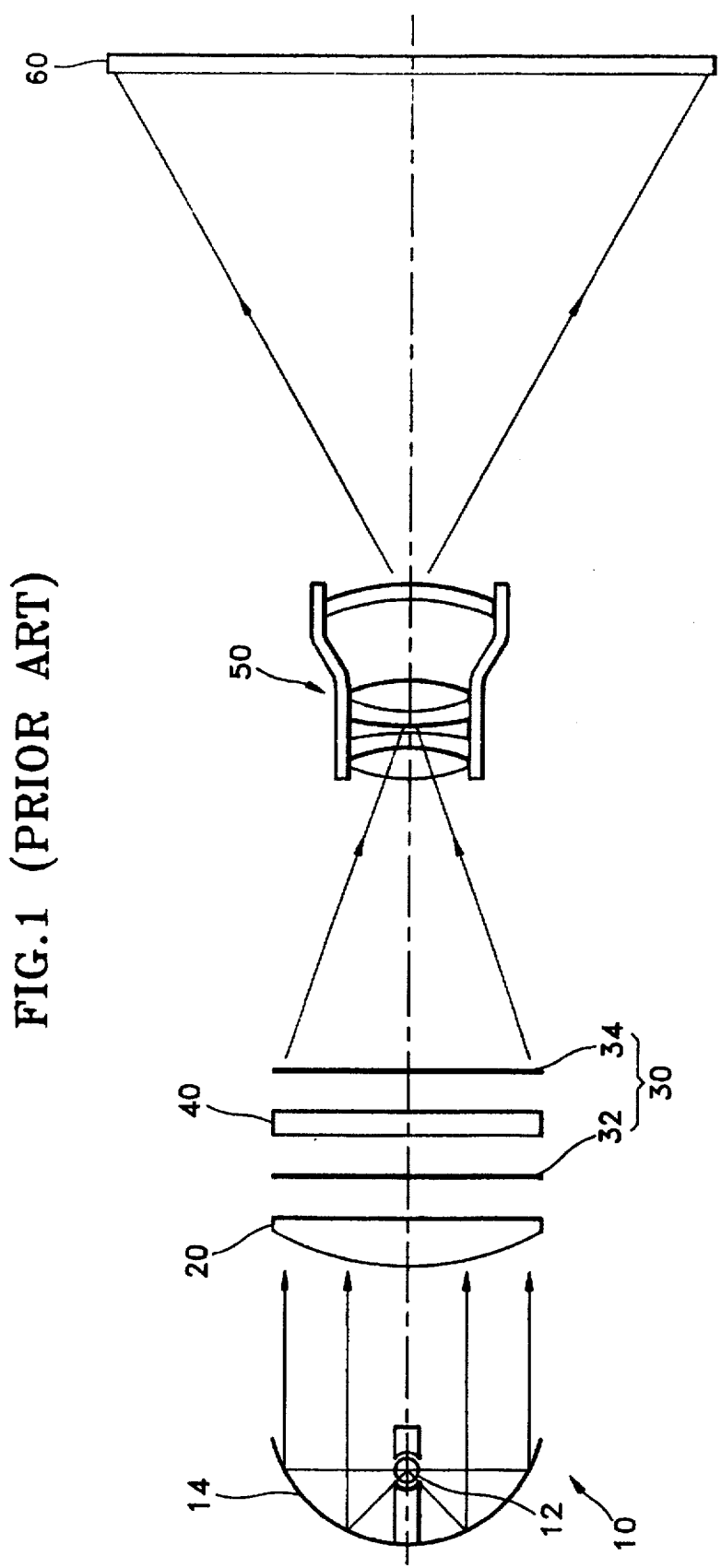
FIG. 1 is a schematic view showing an optical construction of a projector in a conventional three-dimensional picture projecting device.
Figure 2:
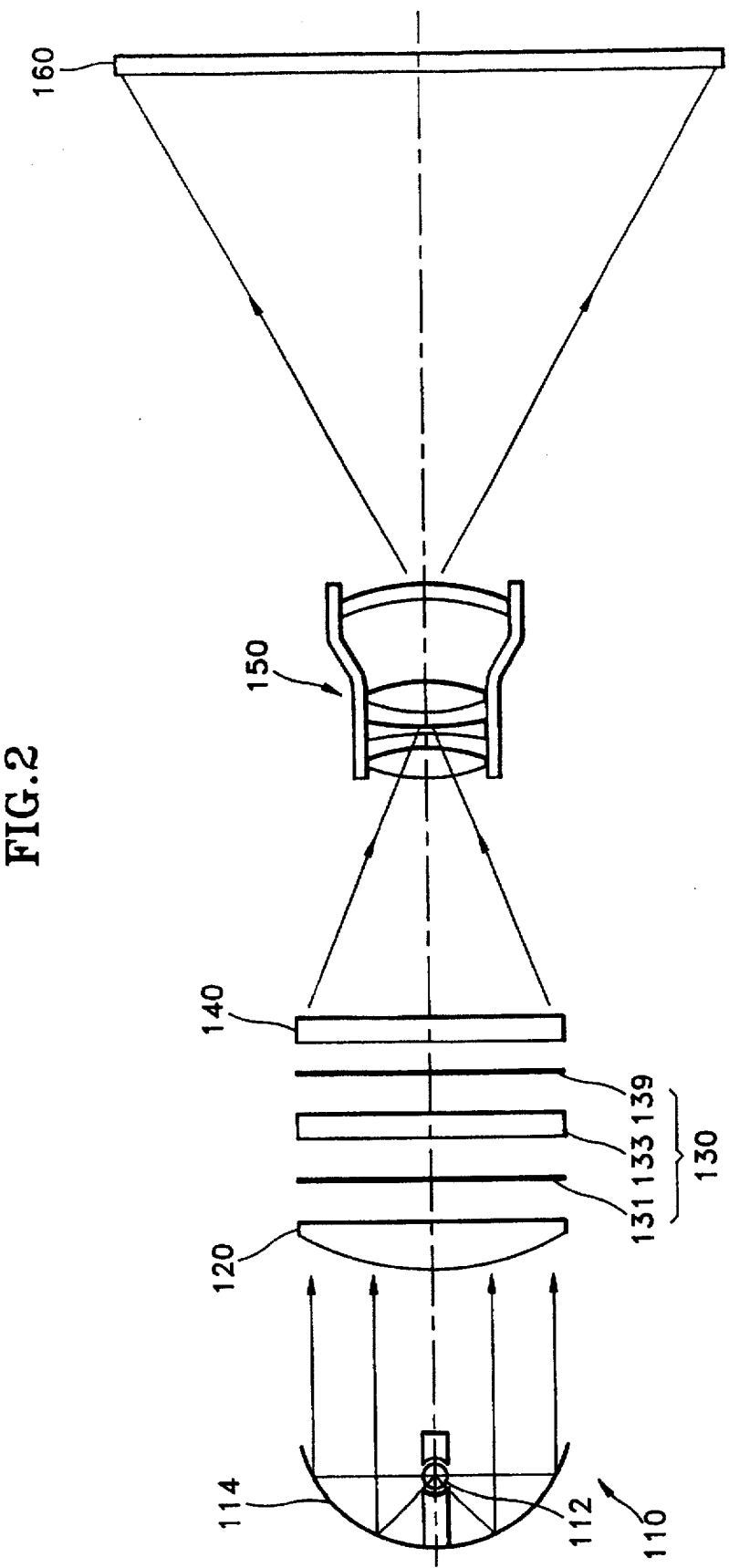
FIG. 2 is a schematic view showing an optical construction of a projector in a three-dimensional picture projecting device according to the present invention.

FIG. 2 shows the projector in relation to the screen 160. Referring to FIG. 2, the projector according to the present invention includes a light source 110 for emitting light, a focusing lens 120 for focusing the light emitted from the light source 110, picture forming means 130 for forming left-eye and right-eye pictures from the light transmitted through the focusing lens 120, polarization changing means 140 for making polarization directions of the left-eye and right-eye pictures formed in the picture forming means 130 different from each other, and a projection lens 150 for magnifying the pictures on the screen 160. The light source 110 includes a lamp 112 and a reflection mirror 114 for reflecting the light emitted from the lamp 112 toward the picture forming means 130.

The reflection mirror 114 is preferably formed such that the reflected light travels in parallel with the optical axis of the projector.

The picture forming means 130 is preferably a liquid crystal device having a first polarizing plate 131, a liquid crystal assembly 133, including a pair of parallel transparent electrode layers (not shown) and a layer (not shown) of liquid molecules disposed between the transparent electrode layers, and a second polarizing plate 139. The picture forming means 130 receives the light emitted from the light source 110, to thereby form a picture.

The light emitted from the light source 110 is polarized by the first polarizing plate 131, and passes through the liquid crystal assembly 133 alternately supplied with electric power from a power source (not shown) according to signals for the left-eye and right-eye pictures and the second polarizing plate 139. Thus, the picture forming means 130 alternately forms the left-eye and right-eye pictures polarized in the predetermined same directions. The polarization changing means 140 alternately makes the same polarization directions of the left-eye and right-eye pictures different from each other, periodically. That is, the polarization changing means 140 changes the polarization direction of the left-eye picture formed by the picture forming means 130 into the same as the polarization direction of the left polarizing eyepiece of the polarizing glasses that a viewer wears, and changes the polarization direction of the right-eye picture formed by the picture forming means 130 into the same as the polarization direction of the right polarizing eyepiece of the polarizing glasses. A period for alternately changing the polarization directions of the left-eye and right-eye pictures is equal to a period at which the left-eye and right-eye pictures are alternately formed in the picture forming means 130. Therefore, since the left-eye and right-eye pictures of different polarization directions are alternately projected on the screen 160 through the projection lens 150, the viewer can enjoy the three-dimensional pictures by wearing the polarizing glasses having the left and right polarizing eyepieces of which the polarization directions are respectively the same as those of the left-eye and right-eye pictures.

Figure 4A:
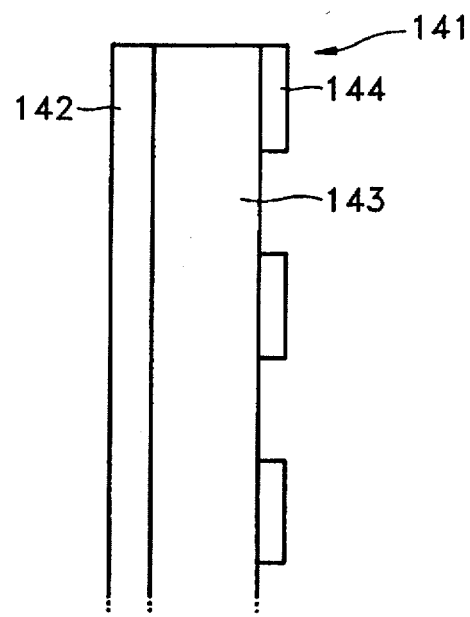
FIGS. 4A and 4B are schematic views showing an embodiment of a polarization changing device according to the present invention.

Referring to FIG. 4A, the polarization changing device 140 (see FIG. 2) is preferably a liquid crystal assembly, and the liquid crystal assembly 141 includes a pair of transparent electrode layers 142 and 144 and a spiral liquid crystal molecule layer 143 interposed therebetween. For example, when electric power is not applied to the transparent electrode layers 142 and 144, the left-eye picture formed in the picture forming means 130 passes through the liquid crystal assembly 141 along the spiral liquid crystal molecules. Meanwhile, when electric power is applied to the transparent electrode layers 142 and 144, the liquid crystal molecules are aligned, thus the right-eye picture passes through the liquid crystal assembly 141 along the aligned liquid crystal molecules. Accordingly, the polarization directions of the left-eye and right-eye pictures transmitted through the polarization changing means 140 are different from each other. Here, a period for supplying electric power to the transparent electrode layers 142 and 144 is identical to a period for alternately forming the left-eye and right-eye pictures in the picture forming means 130.

Figure 3:
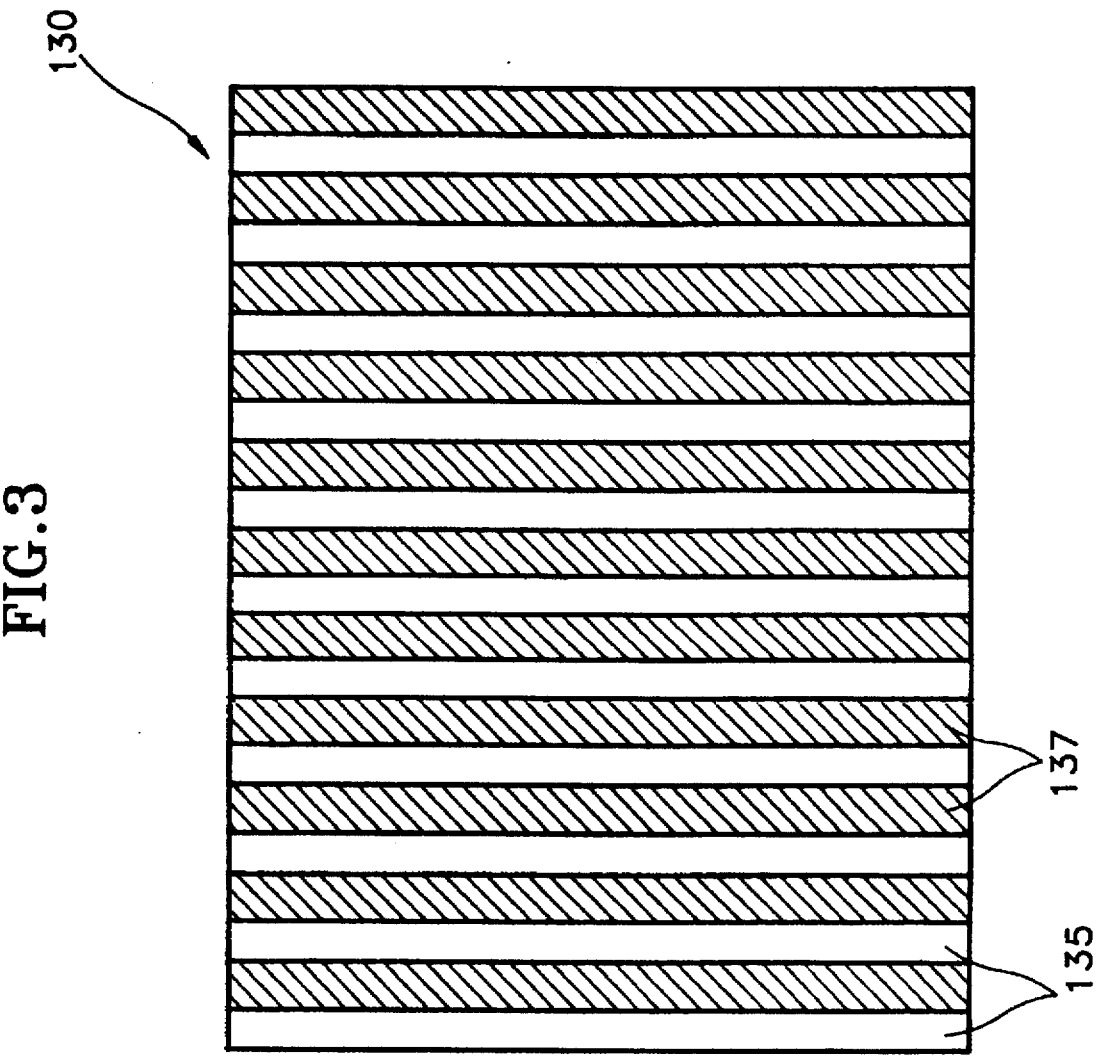
FIG. 3 is a front view showing picture forming means for simultaneously forming the left-eye and right-eye pictures, according to the present invention.

The picture forming means 130 can be divided into a left-eye picture forming portion and a right-eye picture forming portion to simultaneously form the left-eye and right-eye pictures. That is, referring to FIG. 3, the picture forming means 130 has a plurality of first pixel lines 135 for forming the left-eye picture and a plurality of second pixel lines 137 between first pixel lines 135 for forming the right-eye picture. In this case, the first and second pixel lines 135 and 137 respectively form left-eye and right-eye pictures, simultaneously, and a liquid crystal assembly 141 (see FIG. 4A) or a phase delay plate 145 (see FIG. 4B) can be used as the polarization changing means 140 (see FIG. 2) in front of the picture forming means 130.

Figure 4B:
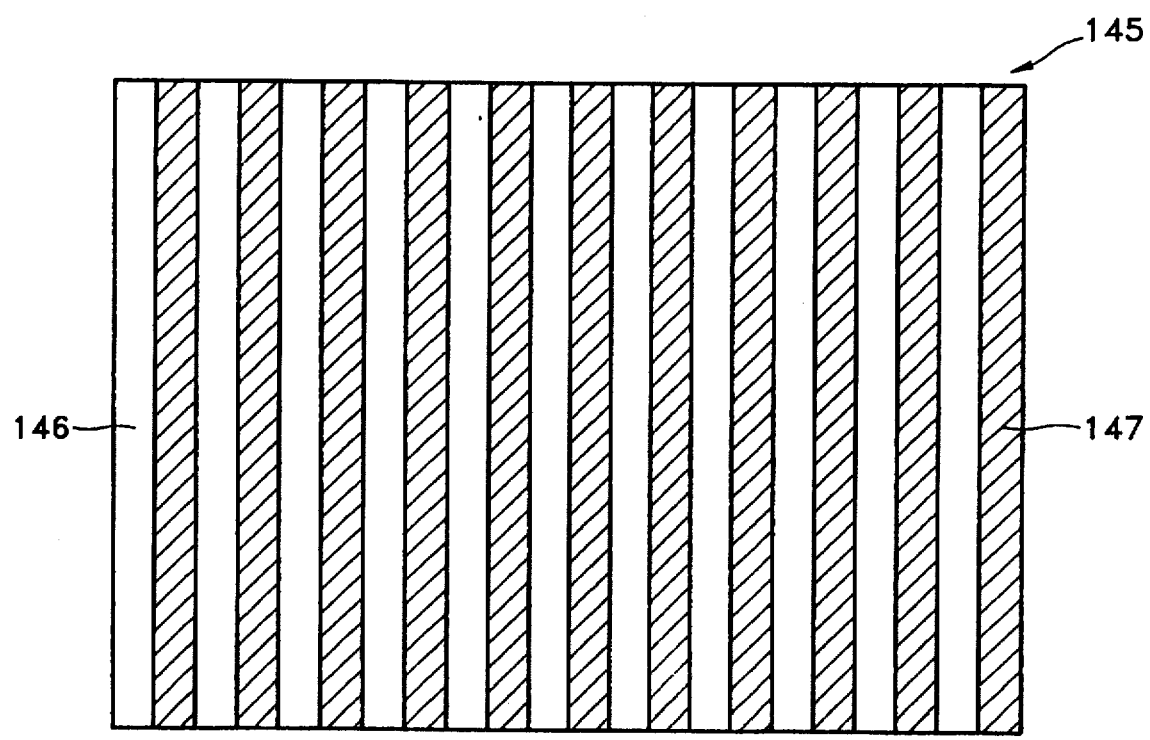

Referring to FIG. 4B, the phase delay plate 145 used as the polarization changing means 140 also has first polarization changing lines 146 and second polarization changing lines 147 corresponding to the first and second pixel lines 135 and 137, respectively. Either of the first and second polarization changing lines 146 and 147 changes the polarization direction of the left-eye picture formed in the first pixel lines 135 or the right-eye picture formed in the second pixel lines 137, so that polarization directions of left-eye and right-eye pictures captured on the screen 160 (see FIG. 2) differ from each other.

The phase delay plate 145 is preferably a half-wavelength plate for delaying a phase to make the polarization direction of the left-eye picture orthogonal to that of the right-eye picture. Use of this phase delay plate 145 simplifies the structure of the polarization changing means 140 and obviates the need for a driving power source.

As described above, the three-dimensional picture projecting device provides three-dimensional pictures with a single projector. Therefore, the structure of the device is simple and small, and its manufacturing cost is low.

What is claimed is:

1. A three-dimensional picture projecting device comprising:

a projector for projecting a three-dimensional picture;

a screen for capturing said three-dimensional picture; and a pair of polarizing glasses having left and right polarizing eyepieces with different polarization directions, wherein said projector comprises:

a light source;

focusing lens for focusing the light emitted from said light source;

picture forming means for receiving the light emitted from said light source and for forming a left-eye picture and a right-eye picture;

polarization changing means for providing polarization directions of said left-eye picture and said right-eye picture different from each other; and a projection lens for magnifying said left-eye picture and said right-eye picture on said screen.

2. The three-dimensional picture projecting device as claimed in claim 1, wherein said polarization changing means is a liquid crystal assembly including a pair of transparent electrode layers and a liquid crystal molecule layer disposed between said transparent electrode layers.

3. The three-dimensional picture projecting device as claimed in claim 1, wherein said polarization changing means is a phase delay plate.

4. The three-dimensional picture projecting device as claimed in claim 3, wherein said phase delay plate is a half-wavelength plate for phase-delaying to render the polarization direction of said left-eye picture orthogonal to that of said right-eye picture.

5. The three-dimensional picture projecting device as claimed in claim 1, wherein said picture forming means is a liquid crystal device comprising a liquid crystal assembly which has a pair of transparent electrode layers and a liquid crystal molecule layer disposed between said transparent electrode layers; first and second polarizing plates installed on the front and rear surfaces of said liquid crystal assembly, respectively.

6. The three-dimensional picture projecting device as claimed in claim 5, wherein said picture forming means alternately forms said left-eye picture and said right-eye picture, periodically.

7. The three-dimensional picture projecting device as claimed in claim 6, wherein said polarization changing means is a liquid crystal assembly including a pair of transparent electrode layers and a liquid crystal molecule layer disposed between said transparent electrode layers, and wherein said polarization changing means provides for polarization directions of said left-eye picture and said right-eye picture different from each other during a period when said left-eye picture and said right-eye picture are formed in said picture forming means.

8. The three-dimensional picture projecting device as claimed in claim 5, wherein said picture forming means is divided into a left-eye picture forming portion and a right-eye picture forming portion to simultaneously form said left-eye picture and said right-eye picture.

9. The three-dimensional picture projecting device as claimed in claim 8, wherein said left-eye picture forming portion comprises a plurality of first pixel lines spaced from one another by a predetermined distance, and said right-eye picture forming portion comprises a plurality of second pixel lines, each being disposed between first pixel lines.

10. The three-dimensional picture projecting device as claimed in claim 9, wherein said polarization changing means comprises a plurality of first polarization changing lines arranged in positions corresponding to said first pixel lines, and a plurality of second polarization changing lines arranged in positions corresponding to said second pixel lines.

11. The three-dimensional picture projecting device as claimed in claim 10, wherein said polarization changing means is a liquid crystal assembly including a pair of transparent electrode layers and liquid crystal molecules disposed between said transparent electrode layers.

12. The three-dimensional picture projecting device as claimed in claim 10, wherein one of said first and second polarization changing lines is formed with a phase delay plate.

13. The three-dimensional picture projecting device as claimed in claim 12, wherein said phase delay plate is a half-wavelength plate for phase-delaying to render the polarization direction of said left-eye picture different from that of said right-eye picture.

* * * * *